United States Patent [19]
Brenes et al.

[11] Patent Number: 5,597,184
[45] Date of Patent: Jan. 28, 1997

[54] QUICK RELEASE CLAMP FOR BONNET AND FLANGE OF GATE VALVES

[75] Inventors: Arthur J. Brenes, Castro Valley; Fabian M. Van De Graff, Fremont, both of Calif.

[73] Assignee: High Vacuum Apparatus Mfg., Inc., Hayward, Calif.

[21] Appl. No.: 315,562

[22] Filed: Sep. 30, 1994

[51] Int. Cl.⁶ .................................................. F16L 35/00
[52] U.S. Cl. ........................... 285/24; 285/91; 285/349; 285/365; 285/409
[58] Field of Search ....................... 285/365, 409, 285/411, 24, 91, 349; 292/256.69

[56] References Cited

U.S. PATENT DOCUMENTS

| | | | |
|---|---|---|---|
| 3,042,430 | 7/1962 | Guy | 285/365 |
| 3,705,737 | 12/1972 | Westerlund et al. | 285/365 |
| 4,170,260 | 10/1979 | Rudd et al. | 285/411 X |
| 4,969,923 | 11/1990 | Reeder | 285/365 |
| 5,320,391 | 6/1994 | Luthi | 285/365 |

FOREIGN PATENT DOCUMENTS

| | | | |
|---|---|---|---|
| 679429 | 2/1964 | Canada | 285/365 |
| 322659 | 4/1970 | Sweden | 285/365 |
| 744046 | 2/1956 | United Kingdom | 285/365 |

*Primary Examiner*—Dave W. Arola
*Attorney, Agent, or Firm*—Julian Caplan; Flehr, Hohbach, Test, Albritton & Herbert

[57] ABSTRACT

A clamp for quick release of a generally rectangular bonnet to the flange of valve body is disclosed. The upper side of the edge of the rectangular bonnet is formed with a bevel of about 20 degrees and the lower side of the edge of the body flange is formed with a similar bevel. The clamp consists of semi-circular ends and straight sides hinged together. One side is split and connected by a toggle latch. In cross-section, each clamp section is generally C-shaped, with the top and bottom arms of the C being beveled so that as the clamp sections are drawn inward the bevels wedge the bonnet against the flange. Locating pins fitting into holes in the plate and flange locate the parts and resist implosion when the valve body is subjected to vacuum. To maintain uniform clamping force around the circumference of the bonnet the bevels at the middles of the sides may be less wide than at the ends.

26 Claims, 2 Drawing Sheets

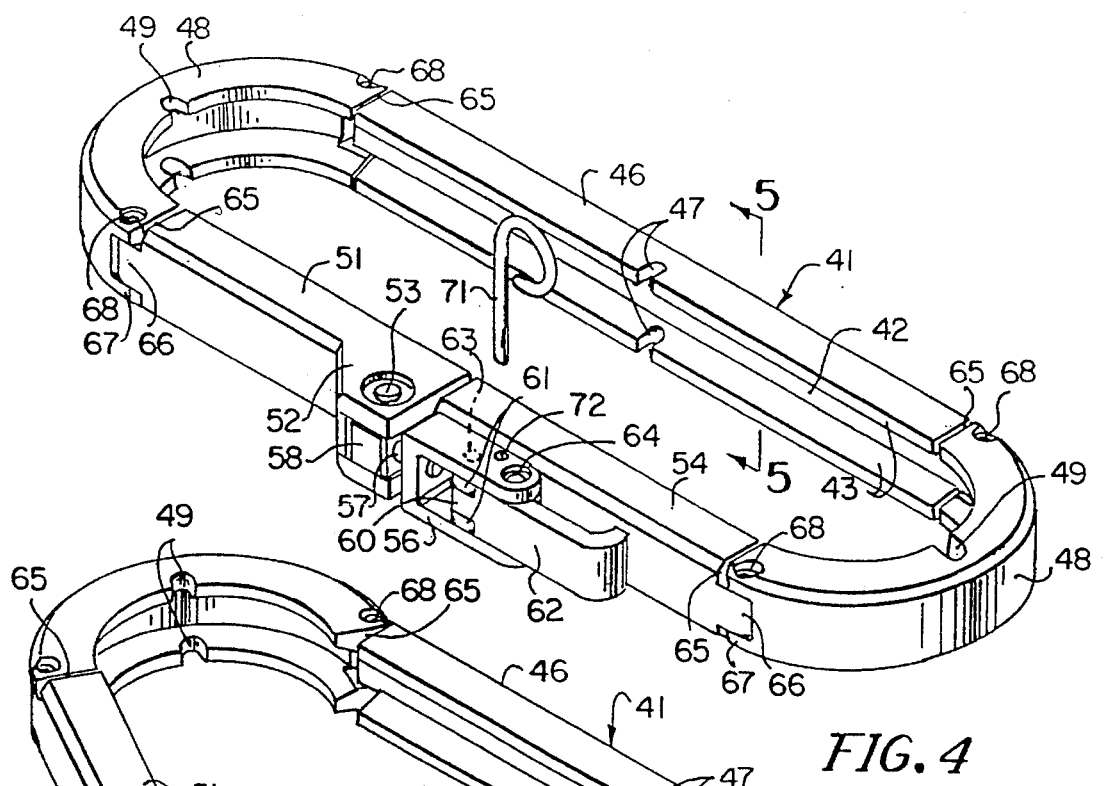
FIG. 4
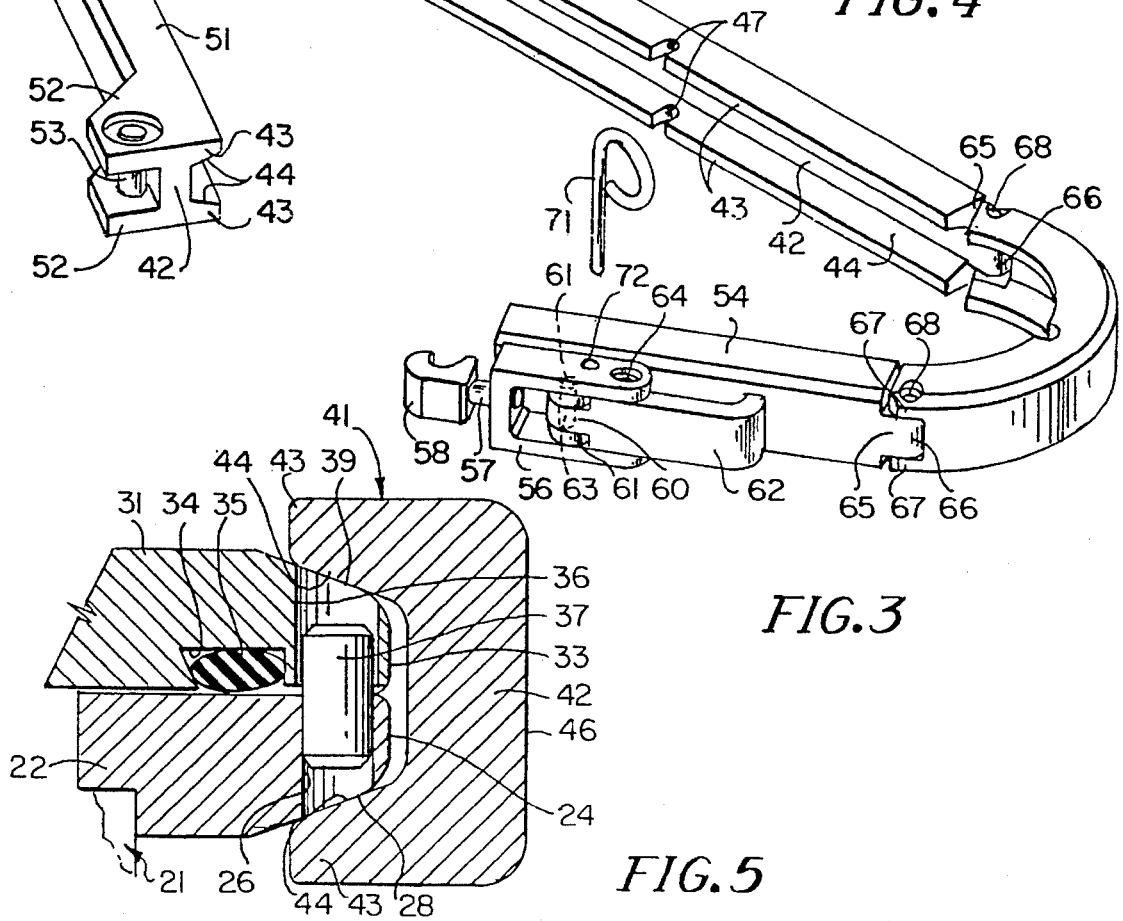
FIG. 3
FIG. 5

QUICK RELEASE CLAMP FOR BONNET AND FLANGE OF GATE VALVES

BACKGROUND OF THE INVENTION

1. Field of the Invention

This invention relates to a new and improved quick release clamp for the bonnet and flange of gate valves. More particularly, the invention relates to a releasable clamp used with rectangular bonnet gate valves to seal the bonnet to the flange on the top of the valve body by a jointed clamp member having a toggle latch.

2. Description of Prior Art

Valve bonnets have been attached to the top body flange of non-circular gate valves by the use of bolts or other threaded attachment devices. Connecting and disconnecting such bolts is time consuming. Further, frequently the space available in locations where such valves are installed impedes the procedure.

Toggle clamps have been used in the dairy and food processing industries for quick connection and release of round cross section members such as pipes.

Toggles have been used to engage clamps in a number of environments.

The present invention, however, affords the advantages of toggle connections for clamps to secure non-circular members, such as "rectangular" valves, together.

SUMMARY OF THE INVENTION

A preferred instance where the present invention may be employed is in attaching a rectangular bonnet plate to a rectangular body flange of a valve used in vacuum lines. The valve body is provided with a top flange having semi-circular ends and straight sides between the ends. The bonnet is substantially congruent with the external outline of the flange.

In accordance with the present invention, a bevel, for instance, preferably of about 20 degrees with reference to the horizontal, is formed circumferentially around the top surface of the bonnet and the bottom surface of the body flange. The clamp is preferably made of several sections of an extruded material of generally C-shape material. The base of the C is vertical and the arms of the C extend inwardly relative to the bonnet and flange. Bevels are formed on the internal corners of the arms of the clamp body complementary to the bevels on the bonnet and flange. When, as hereinafter explained, the C cross-sections are drawn inwardly, the mating bevels compress the bonnet and the flange together. Customarily a rubber-like seal is interposed between the clamp members to provide a vacuum-type seal.

The clamp consists of at least five sections which are hinged together. At each end is a semi-circular section matching the semi-circular ends of the flange and bonnet. A single substantially straight clamp side hingedly interconnects opposed ends of the semi-circular clamp members. On the opposite side, there are two side sections, the outer ends of which are hinged to ends of the semi-circular sections. A toggle latch interconnects the two side sections together and draws the entire clamp tight. When the clamp is tightened, the bevel surfaces ramp the bonnet tightly downwardly against the valve body flange to seal against the same.

To reduce the tendency of implosion of the valve body when vacuum is drawn, vertical pins are secured to the flange extending upwardly and fit through over-sized holes in the bonnet. Preferably there is one such pin at each end and one in the middle of the long straight side. In order to provide clearance for such pins, notches are formed in the arms of the clamp sections at appropriate places. These notches not only provide clearance for the pins but also assist in locating the clamp sections in proper position.

Particularly where the straight sections are relatively long, the width of the bevels of both the bonnet and the valve flange are reduced at the center. Reducing the width of the bevel increases the clamping force when the clamp is drawn tight, overcoming any tendency of a long-sided clamp to bow outward, a result of which would tend to cause the valve to leak.

To prevent accidental unlatching of the toggle mechanism, a lock may be used to hold the toggle closed.

Accordingly, one of the objects of the present invention is to reduce the time and effort required in the use of conventional bolted construction. Additionally, the clamp may be applied and removed in confined areas as compared with the space requirements for installing and removing bolts.

Another object of the invention is to provide a substantially uniform clamping pressure around the entire circumference of the valve, thereby overcoming a tendency of the seal to leak at the center of relatively long sides.

Still another feature and advantage of the invention is the use of pins extending up from the valve body flange through holes in the bonnet to resist implosion of the valve body when vacuum is drawn therein and the formation of notches in the latch to provide clearance for the pins.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 3 is a perspective view of a clamp in open position.

FIG. 4 is a perspective view of the clamp in closed position.

FIG. 5 is an enlarged sectional view through the flange, bonnet and clamp taken substantially along the line 5—5 of FIG. 4.

DESCRIPTION OF THE PREFERRED EMBODIMENTS

Figure 1:
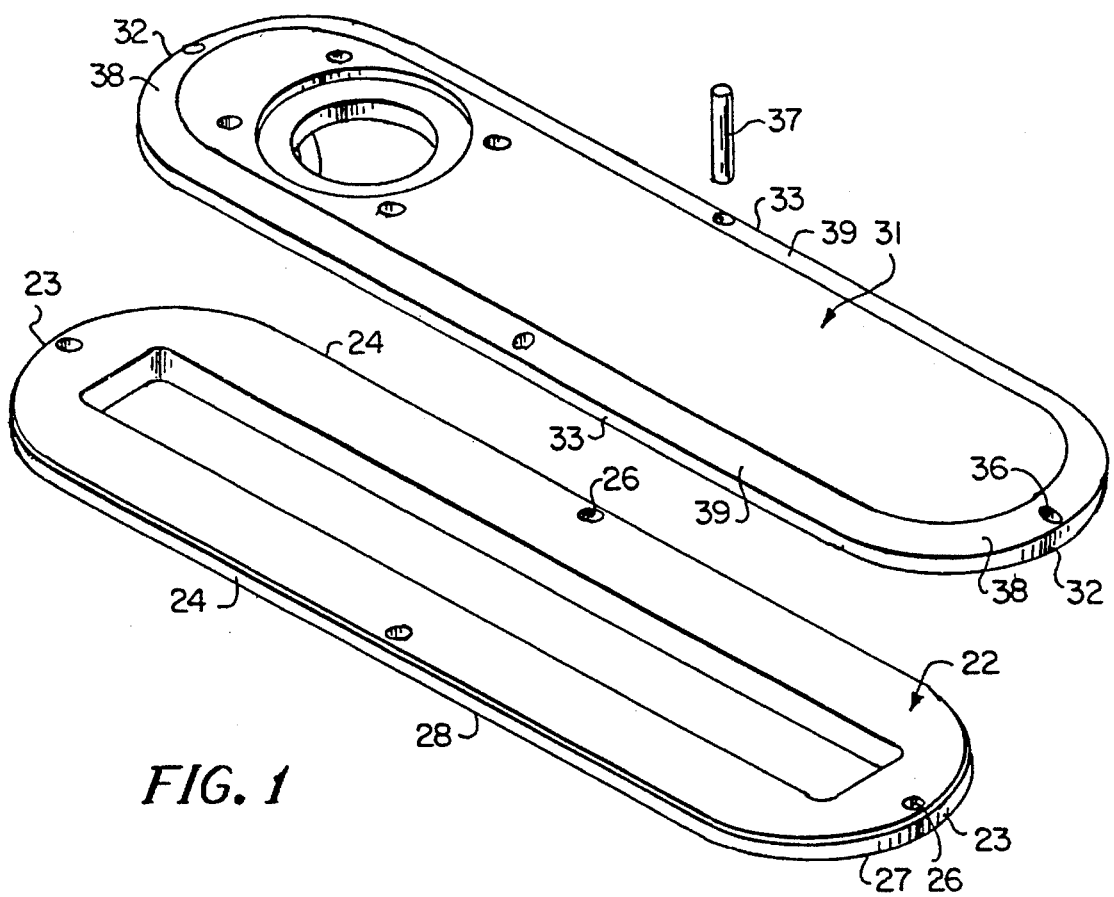
FIG. 1 is an exploded perspective view of a bonnet and body flange in accordance with the present invention.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Valve body 21 is hollow and generally rectangular in cross section. At its upper end it is provided with outward extending top flange 22 having semi circular ends 23 and straight sides 24. At three positions, namely each end and the middle of one of the sides holes 26 are formed in flange 22 to receive vertical pins 37.

Figure 2:
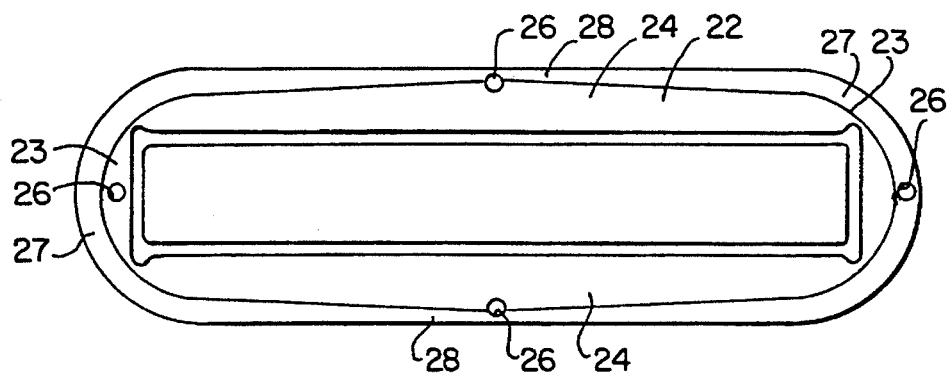
FIG. 2 is a bottom plan view of a valve body showing the underside of the valve flange.

As best shown in FIG. 2, bevels 27 are formed on the undersides of each end 23 and bevels 28 are formed on sides 24. Especially when sides 24 are elongated, the bevels 28 are thinner at the centers of sides 24 than at the ends 23. Machining the bevels in this fashion is a relatively simple operation. The bevels on the clamp (as hereinafter explained) are preferably uniform throughout since machining different bevels on the clamp arms would be a much more complex operation. Since the bevel 28 is thinner at the center than at the ends, a greater clamping force is applied at the middle than at the ends so that a vacuum seal is produced throughout.

Bonnet plate 31 shown in the upper portion of FIG. 1 has semicircular ends 32 and relatively straight sides 33 congruent with the outline of flange 22. A groove 34, here shown as dove tail in cross-section, is formed in the underside of bottom 31 to receive a compressible elastomeric seal ring 35 which seals against the matching surface of flange 22 when the parts are clamped together.

Holes 36 are formed in bonnet 31 at each end and at the middle of each side to receive pins 37 fixed in holes 26. Preferably holes 36 are somewhat over-sized to permit some flexing of the flange 22 relative to the bonnet 31. Bevels 38 are formed on the pins 32 insert on the upper surface of ends 32 and bevels 39 and formed on the upper surfaces of sides 33 in the same manner as the bevels 28. Bevels 39 are thinner at the centers of sides 33 as in the case of bevels 28.

Clamp 41 is formed of C-shape stock having a vertical base 42 and inward extending top and bottom arms 43. The corners of the arms 43 are formed with bevels 44 matching the angles of the bevels 27, 28, 38, and 39, which is preferably 20° to the horizontal. Thus when, as hereinafter explained, the base 42 is pulled inward relative to the bonnet 31 and flange 22, the mating bevels bias the bonnet and flange toward each other, clamping the ring 35 therebetween to form a vacuum tight joint.

Clamp 41 is formed of several sections. Thus there is an elongated side 46 which may be formed with a notch 47 to receive and provided clearance for pins 37. It will be understood that pins 37 also helped to locate the clamp in position. Ends 48 are circular and are also provide with notches 49 to receive the end pins 37. The side opposite side 46 is made of two sections 51 and 54. Side 51 at its inner end is formed with vertically spaced outward extensions 52. Vertical latch pin 53 extends between the extensions 52.

Second side section 54 carries a clevis 56 having a boss 57 projecting therefrom carrying on its outer end a hook 58 which engages pin 53. Ears 61 extending outward from side 54 receive the extending tongue 60 of toggle lever 62. Pin 63 through the ears 61 and tongue 60 cause the lever 62 to pivot relative to side member 54. Pin 64 interconnects the clevis arms 56 to the toggle lever 62. It will be seen that when the clamp is closed as in FIG. 4, pin 63 is inward of a line joining pins 53 and 64 so that the toggle remains closed until the lever 62 is pulled outward from the position it assumes in FIG. 4.

The various sections making up the clamp 41 are hinged together at hinges 65. At each hinge 65 one of the members has a projecting hinge tongue 66 fitting within a hinge tenon 67 of the adjacent member with a hinge pin 68 passing through both portions of the tenon 67 and tongue 66.

As a safety precaution, a lock pin 71 may be passed through a hole 72 in clevace 56 and also through an underlying hole (not shown) in the upper ear 61. So long as the pin 71 is in place, toggle lever 62 may not be opened.

With the bonnet 31 in place over the flange 22 and the pins 71 extending up through the holes 36, side 46 of clamp 41 is positioned along one of the sides 24, 32 of the assembled bonnet and valve body flange. Notches 47 assist in locating side 46 in place. The ends 48 are then pivoted inwardly about hinges 65 to engage ends 23, 32. The side sections 51, 54 are pivoted inwardly. Thereupon, with the latch lever 62 in outward position, the hook 58 is caused to engage the pin 53. When the lever 62 is pushed inward to the position of FIG. 4, the sides 51 and 54 are drawn together. All of the clamp members bear against the edges of the bonnet plate 32 and valve flange 22 and by reason of the bevels, as heretofore described, the bonnet 31 is ramped tight against the flange 22, compressing the seal ring 34 and causing a vacuum tight seal. To prevent unintentional opening of the clamp, the lock pin 71 may be installed. As used in the accompanying claims, the term "thinner" means the amount of material which remains after the bevel is formed. As shown in FIG. 5, the thinner sides 24 and 33 at their bevels, the more pressure is applied at the thicker parts by clamp 41 by reason of its converging bevels 44.

When it is necessary to disconnect the parts, the lock pin 71 is removed and the lever 62 opened to cause the hook 58 to disengage the pin 53. Thereupon the various clamp sections may be unfolded in reverse order to the sequence of application, the latch removed and the bonnet plate lifted off the flange 22.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In combination, a first member having a non-circular, outward-extending upper edge comprising opposed semicircular first member ends and opposed first member sides having first member centers said first member sides interconnecting said first member ends, a second member having an external outline substantially congruent with an external outline of said first member comprising opposed semicircular second member ends and opposed second member sides having second member centers interconnecting said second member ends, said first member having a first top surface and a first bottom surface, said first top surface being formed with a circumferential first bevel, said second member having a second top and a second bottom surface, said second bottom surface being formed with a circumferential second bevel, said first bottom surface overlying said second top surface, said first bevel being substantially thinner at said first member centers than at said first member sides, said second bevel being substantially thinner at said second member centers than at said second member sides, and a clamp having a first arm formed with a third bevel substantially complementary to said first bevel, a second arm formed with a fourth bevel substantially complementary to said second bevel and a base connecting the outer edges of said first and second arms, said clamp fitting around and partially overlapping said upper edges of said first member ends and sides and partially overlapping the lower edges of said second member ends and sides, said clamp comprising a plurality of sections hinged together and connecting means for connecting said sections together, whereby said first and second members are clamped together.

2. The combination of claim 1 in which said clamp sections comprise a pair of clamp end sections engaging said first member and said second member ends, a clamp first side section engaging one of each of said first member sides and said second member sides, a clamp second side section and a clamp third side section, said clamp second side section and said clamp third side section together engaging another of each of said first member sides and said second member sides, said connecting means connecting ends of said clamp second and third side sections together.

3. The combination of claim 2 in which said clamp first side section is hingedly connected to both said clamp end sections and said clamp second side section is hingedly connected to one of said clamp end sections and said clamp third side section is hingedly connected to the other said clamp end section.

4. The combination of claim 2 in which said clamp sections are of substantial identical cross-section.

5. The combination of claim 4 in which said clamp sections are extrusions.

6. The combination of claim 2 in which said connecting means comprises a toggle joint.

7. The combination of claim 6 which further comprises a removable lock to lock said toggle joint in clamped position.

8. The combination of claim 6 in which said second side section has outward extending vertically spaced extensions and a latch pin between said extensions, said third side section has at least one outward extending ear and which further comprises a toggle lever pivoted to said ear by a first pivot, a hook on said toggle lever shaped to engage said latch pin and an extension of said hook pivoted to said toggle lever by a second pivot on the side of said first pivot opposite said latch pin.

9. The combination of claim 1 in which said bases of said clamp sections are positioned outside the perimeters of said first member and said second member and said arms of said clamp sections extend inwardly of the perimeters of said first and second numbers, said bevels of the top surfaces of said first member engaging said first clamp arms and said bevels on the bottom surfaces of said second member engaging said second clamp arms.

10. The combination of claim 1 in which said first member comprises a peripheral flange extending outwardly of the upper end of a gate valve body and said second member comprises a bonnet for said flange.

11. The combination of claim 10 which further comprises an elastomeric seal in said bonnet positioned to form a seal against said flange.

12. The combination of claim 10 in which said gate valve body is adapted to be subjected to vacuum.

13. The combination of claim 1 in which each of said bevels is approximately 20 degrees.

14. A clamp for use with a first member having a non-circular, outward-extending upper edge comprising opposed semi-circular first member ends and opposed first member sides interconnecting the first member ends and a second member having an external outline substantially congruent with an external outline of the first member comprising opposed semi-circular second member ends and opposed second member sides interconnecting the second member ends, the first member having a first top and a first bottom surface, the first and second sides having first and second centers, respectively, the first top surface being formed with a circumferential first bevel, the second member having a second top and a second bottom surface, the second bottom surface being formed with a circumferential second bevel, the first bottom surface overlying the second top surface, the first bevel being substantially thinner at the first member centers than at the first member sides, the second member centers being substantially thinner at the second member centers than at the second member sides, said clamp comprising a first arm formed with a third bevel substantially complementary to the first bevel, a second arm formed with a fourth bevel substantially complementary to the second bevel and a base connecting the outer edges of said first and second arms, said clamp shaped and dimensioned to fit around and partially overlap the top surface of the first member ends and sides and partially overlapping the lower edges of the second member ends and sides, said clamp comprising a plurality of sections hinged together and means for drawing said sections together.

15. The clamp of claim 14 in which said clamp sections comprise a pair of clamp end sections engaging the first member and the second member ends, a clamp first side section engaging one of each of the first member sides and the second member sides, a clamp second side section and a clamp third side section, said clamp second side section and said clamp third side section together being shaped and dimensioned to another of each of the first member sides and the second member sides, said connecting means connecting ends of said clamp second and third side sections together.

16. The clamp of claim 15 in which said clamp second side section is hingedly connected to both said clamp end sections and said clamp second side section is hingedly connected to one said clamp end sections and said clamp third side section is hingedly connected to the other said clamp end section.

17. The clamp of claim 15 in which said clamp sections are of substantial identical cross-section.

18. The clamp of claim 15 in which said connecting means comprises a toggle joint.

19. The clamp of claim 18 which further comprises a removable lock to lock said toggle joint in clamped position.

20. The combination of claim 18 in which said second clamp side section has outward extending vertically spaced extensions and a latch pin between said extensions, said third side section has at least one outward extending ear and which further comprises a toggle lever pivoted to said ear by a first pivot, a hook on said toggle lever shaped to engage said latch pin and an extension of said hook pivoted to said toggle lever by a second pivot on the side of said first pivot opposite said latch pin.

21. The clamp of claim 14 in which the bases of said clamp sections are adapted to be positioned outside the perimeters of the first member and the second member with said arms of said clamp sections extending inwardly of the perimeters of the first and second members, the bevels on the top surfaces of the first member engaging said first clamp arms and the bevels of the bottom surfaces of the second member engaging said second clamp arms.

22. The clamp of claim 14 in which each of the first and second bevel members and said clamp bevels is approximately 20 degrees.

23. In combination, a first member having a non-circular, outward-extending upper edge comprising opposed semi-circular first member ends and opposed first member sides interconnecting said first member ends, a second member having an external outline substantially congruent with an external outline of said first member comprising opposed semi-circular second member ends and opposed second member sides interconnecting said second member ends, said first member having a first top surface and a first bottom surface, said first top surface being formed with a circumferential first bevel, said second member having a second top and a second bottom surface, said second bottom surface being formed with a circumferential second bevel, said first bottom surface overlying said second top surface, and a clamp having a first arm formed with a third bevel substantially complementary to said first bevel, a second arm formed with a fourth bevel substantially complementary to said second bevel and a base connecting the outer edges of said first and second arms, said clamp fitting around and partially overlapping said upper edges of said first member ends and sides and partially overlapping the lower edges of said second member ends and sides, said clamp comprising a plurality of sections hinged together and connecting means for connecting said sections together, whereby said first and second members are clamped together, and a plurality of pins passing through aligned holes in said first and second members, said clamp being formed with notches to provide clearance for said pins.

24. The combination of claim 23 in which there is at least one pin in each of said first and second member ends.

25. The combination of claim 24 in which there is at least one pin in at least one of said first and second member sides.

26. A clamp for use with a first member having a non-circular, outward-extending upper edge comprising opposed semi-circular first member ends and opposed first member sides interconnecting said first member and a second member having an external outline substantially congruent with an external outline of said first member comprising opposed semi-circular circular second member ends and opposed second member sides interconnecting said second member sides, ends, said first member having a first top and a first bottom surface, said first top surface being formed with a circumferential first bevel, said second member having a second top and a second bottom surface, said second bottom surface being formed with a circumferential second bevel, said first bottom surface overlying said second top surface, said clamp comprising a first arm formed with a third bevel substantially complementary to said first bevel, a second arm formed with a fourth bevel substantially complementary to said second bevel and a base connecting the outer edges of said first and second arms, said clamp adapted to fit around and partially overlap said upper edge of said first member ends and sides and partially overlapping the lower edges of said second member ends and sides, said clamp comprising a plurality of sections hinged together and means for drawing said sections together.

\* \* \* \* \*